United States Patent
Nariyuki et al.

(10) Patent No.: US 7,652,277 B2
(45) Date of Patent: Jan. 26, 2010

(54) RADIATION IMAGE DETECTING APPARATUS

(75) Inventors: Fumito Nariyuki, Minamiashigara (JP); Keiichiro Sato, Kanagawa-ken (JP); Munetaka Kato, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/341,159

(22) Filed: Dec. 22, 2008

(65) Prior Publication Data

US 2009/0159821 A1 Jun. 25, 2009

(30) Foreign Application Priority Data

Dec. 21, 2007 (JP) .............................. 2007-330381

(51) Int. Cl.
*G01N 23/04* (2006.01)
(52) U.S. Cl. ...................................... 250/591
(58) Field of Classification Search .............. 250/591, 250/370.01–370.15; 378/98.6–98.8
See application file for complete search history.

(56) References Cited

U.S. PATENT DOCUMENTS 6,995,375 B2 2/2006 Sato et al.
7,034,312 B2 4/2006 Sato et al.

FOREIGN PATENT DOCUMENTS

JP 2004146769 A * 5/2004

* cited by examiner

*Primary Examiner*—David P Porta
*Assistant Examiner*—Kiho Kim
(74) *Attorney, Agent, or Firm*—Sughrue Mion, PLLC

(57) ABSTRACT

Generation of dark current due to emission of back lighting to radiation image detectors is sufficiently suppressed. A radiation image detecting apparatus includes a radiation image detector and a light emitting section. A biasing electrode to which a biasing voltage is applied, a photoconductive layer for generating electric charges when irradiated with recording electromagnetic waves bearing a radiation image, a substrate side charge transport layer for transporting the electric charges which are generated in the photoconductive layer, and an active matrix substrate provided with a plurality of charge collecting electrodes for collecting the electric charges which are generated in the photoconductive layer, are laminated in this order to form the radiation image detector. The light emitting section emits light onto the radiation image detector at least during irradiation of the recording electromagnetic waves. The average composition of the substrate side charge transport layer is $Sb_xS_{100-x}$ ($41 \leq x \leq 60$).

7 Claims, 1 Drawing Sheet

RADIATION IMAGE DETECTING APPARATUS

BACKGROUND OF THE INVENTION

1. Field of the Invention

The present invention is related to a radiation image detecting apparatus equipped with a radiation image detector that records radiation images, by generating electric charges when irradiated by recording electromagnetic waves that bear radiation images, and accumulating the generated electric charges. The present invention is particularly related to a radiation image detecting apparatus which is further equipped with a light emitting means for emitting light onto the radiation image detector during irradiation of the recording electromagnetic waves.

2. Description of the Related Art

Various types of radiation image detectors that record radiation images of subjects when irradiated by radiation which has passed through the subjects have been proposed and are in practical use, in the field of medicine and the like.

There are radiation image detectors that utilize amorphous selenium that generate electric charges when irradiated by radiation. Radiation image detectors of this type that employ the TFT readout method have been proposed.

A radiation image detector that employs the TFT readout method and is constituted by: a biasing electrode, to which a biasing voltage is applied; a photoconductive layer for generating electric charges when irradiated with radiation; and an active matrix substrate, in which a great number of pixels that include charge collecting electrodes for collecting the electric charges, which are generated in the photoconductive layer, accumulating capacitors for accumulating the electric charges collected by the charge collecting electrodes, and TFT switches for reading out the electric charges, which are accumulated in the accumulating capacitors, are arranged two dimensionally, are laminated, for example, has been proposed.

In the TFT readout type radiation image detector having the construction described above, radiation which has passed through a subject and bears a radiation image is irradiated onto the radiation image detector from the side of the biasing electrode, in a state during which a positive voltage is being applied to the biasing electrode from a voltage source, to record the radiation image.

The radiation which is irradiated onto the radiation image detector passes through the biasing electrode, and is enters the photoconductive layer. The radiation causes charge pairs to be generated in the photoconductive layer. Among the generated charge pairs, negative electric charges combine with the positive electric charges which are charged in the biasing electrode, and disappear. Meanwhile, positive electric charges from among the generated charge are collected by the charge collecting electrodes of each pixel of the active matrix substrate, accumulated in the accumulating capacitors, and recorded as a radiation image.

The TFT switches of the active matrix substrate are turned ON according to control signals output from a gate driver, to read out the electric charges which are accumulated in the accumulating capacitors. The electric charges are amplified as charge signals by a charge amplifier and detected, to read out image signals corresponding to the radiation image.

In radiation image detectors that employ active matrix substrates as described above, no electrodes for discharging electric charges are provided in the spaces among the charge collecting electrodes which are divided for each pixel. Therefore, the electric charges which are generated due to the irradiation of radiation tend to accumulate within these spaces. As a result, the electric fields which are formed within the photoconductive layer become distorted, causing the problems that the sensitive area of the photoconductive layer changes, and that the sensitivity thereof varies. In addition, there is a problem that the electric charges which have accumulated in the spaces among the charge collecting electrode leak out during readout of charge signals after irradiation of radiation is ceased. The leaked electric charges are output as residual images, causing residual image properties (lag properties) to deteriorate.

To address the above problems, radiation image detecting apparatuses equipped with light sources for emitting back light from the active matrix substrate side of radiation image detectors has been proposed (refer to U.S. Pat. Nos. 6,995,375, and 7,034,312, for example). Electric charges can be accumulated in the spaces among charge collecting electrodes in advance by emitting the back light onto the radiation image detector during irradiation of radiation. Thereby, electric fields which are formed within a photoconductive layer can be distorted in advance. Accordingly, the electric charges which are generated due to the irradiation of the radiation do not accumulate within the aforementioned spaces, move along the electric fields which are distorted in advance, and are collected by the charge collecting electrodes. That is, change in the sensitive area of the photoconductive layer, and the variation in the sensitivity thereof can be suppressed. In addition, the electric charges that leak out from the spaces among the charge collecting electrodes can be prevented from being output as residual images, by continuing to emit the back light after irradiation of the radiation has ceased.

U.S. Pat. Nos. 6,995,375, and 7,034,312, also proposes a radiation image detector provided with an intermediate layer formed by $Sb_2S_3$ between the photoconductive layer and the active matrix substrate. The amount of back light which is emitted into the photoconductive layer can be decreased by providing the intermediate layer, thereby suppressing generation of dark current within the photoconductive layer.

However, an intermediate layer formed by $Sb_2S_3$ cannot sufficiently absorb back light, and generation of dark current within the photoconductive layer due to emission of the back light thereon remains a problem.

SUMMARY OF THE INVENTION

The present invention has been developed in view of the foregoing circumstances. It is an object of the present invention to provide a radiation image detecting apparatus equipped with a radiation image detector which is capable of sufficiently suppressing generation of dark current due to emission of back light into a photoconductive layer.

A radiation image detecting apparatus of the present invention is equipped with a radiation detector, comprising: a biasing electrode to which a biasing voltage is applied; a photoconductive layer for generating electric charges when irradiated with recording electromagnetic waves bearing a radiation image; a substrate side charge transport layer for transporting the electric charges which are generated in the photoconductive layer; and an active matrix substrate provided with a plurality of charge collecting electrodes for collecting the electric charges which are generated in the photoconductive layer; laminated in this order. The radiation image detecting apparatus is also equipped with light emitting means, for emitting light onto the radiation image detector at least during irradiation of the recording electromagnetic waves. The radiation image detecting apparatus is characterized by the average composition of the substrate side charge transport layer being $Sb_xS_{100-x}$ ($41 \leq x \leq 60$).

In the radiation image detector of the present invention, the film thickness of the substrate side charge transport layer may be greater than or equal to 0.5 μm.

The radiation image detector of the present invention may further comprise: a biasing electrode side charge transport layer, provided between the biasing electrode and the photoconductive layer. In this case, the average composition of the biasing electrode side charge transport layer may be $Sb_yS_{100-y}$ ($41 \leq y \leq 60$).

An organic polymer layer that contains a positive hole blocking material may further be provided between the biasing electrode side charge transport layer and the photoconductive layer.

Even in cases that the biasing electrode side charge transport layer is not provided, an organic polymer layer that contains a positive hole blocking material may be provided between the biasing electrode side charge transport layer and the photoconductive layer.

The positive hole blocking material may be at least one carbon cluster selected from among a group consisting of: fullerene $C_{60}$; fullerene $C_{70}$; oxidized fullerene; and derivatives thereof.

In the radiation image detecting apparatus of the present invention, the average composition of the substrate side charge transport layer, which is provided between the photoconductive layer and the active matrix substrate, is $Sb_xS_{100-x}$ ($41 \leq x \leq 60$). Therefore, light emitted from the light emitting means entering the interior of the photoconductive layer can be sufficiently suppressed. Accordingly the generation of dark current can be suppressed.

In the radiation image detector of the present invention, the film thickness of the substrate side charge transport layer may be greater than or equal to 0.5 μm. In this case, the entry of light into the photoconductive layer can be more effectively suppressed.

The radiation image detector of the present invention may further comprise: a biasing electrode side charge transport layer, provided between the biasing electrode and the photoconductive layer, and the average composition of the biasing electrode side charge transport layer may be $Sb_yS_{100-y}$ ($41 \leq y \leq 60$). In this case, the charge transport properties of the biasing electrode side charge transport layer can be improved. Therefore, electric charges which are trapped as bulk charges in the photoconductive layer can be swept out toward the biasing electrode more efficiently. Accordingly, long term lag properties (to be described layer) can be improved.

An organic polymer layer that contains a positive hole blocking material may be provided between the biasing electrode side charge transport layer and the photoconductive layer, or between the biasing electrode and the photoconductive layer in the case that the biasing electrode side charge transport layer is not provided. In this case, the number of faults in the interface of the photoconductive layer can be decreased. Therefore, the amount of electric charges which become trapped in the faults can be decreased, and short term lag properties (to be described later) can be improved.

BEST MODE FOR CARRYING OUT THE INVENTION

Figure 1:
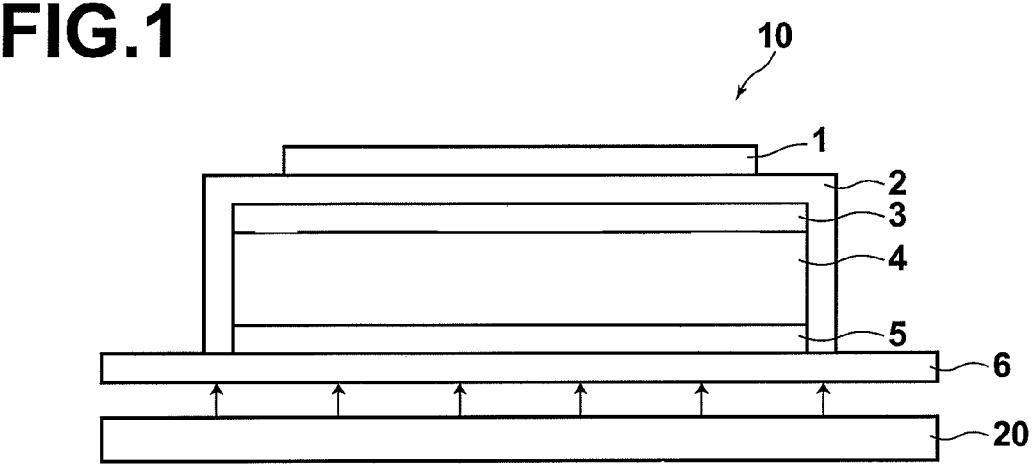
FIG. 1 is a sectional view that schematically illustrates the construction of a radiation image detecting apparatus according to an embodiment of the present invention.

Hereinafter, a radiation image detecting apparatus according to an embodiment of the present invention will be described with reference to the attached drawings. The radiation image detecting apparatus of the present embodiment is equipped with a TFT readout type radiation image detector. FIG. 1 is a sectional view that schematically illustrates the construction of the radiation image detecting apparatus.

The radiation image detecting apparatus of the present embodiment is equipped with: a radiation image detector 10 that records radiation images by generating electric charges when irradiated with radiation, and accumulating the generated electric charges; and a planar light source 20 that emits light onto the radiation image detector 10 during irradiation of the radiation.

The radiation image detector 10 is constituted by: a biasing electrode 1 to which a biasing voltage is applied; a first charge transport layer 2; an organic polymer layer 3; a photoconductive layer 4 for generating electric charges when irradiated with recording electromagnetic waves bearing a radiation image; a second charge transport layer 5 for transporting the electric charges which are generated in the photoconductive layer 4; and an active matrix substrate 6 provided with a plurality of charge collecting electrodes for collecting the electric charges which have passed through the second charge transport layer 5; laminated in this order.

The biasing electrode 1 is formed by a low resistance conductive material, such as Au and Al.

The first charge transport layer 2 is formed from a material that includes antimony sulfide. The average composition of the antimony sulfide is $Sb_yS_{100-y}$ ($41 \leq y \leq 60$). It is more preferable for y to be within a range of $42 \leq y \leq 50$. Note that although it is preferable for the first charge transport layer 2 to be provided, it is not strictly necessary.

The organic polymer layer 3 is formed from an organic polymer material, to which a positive hole blocking material is added. Polycarbonate may be utilized as the organic polymer material, for example. The positive hole blocking material may be at least one carbon cluster selected from among a group consisting of: fullerene $C_{60}$; fullerene $C_{70}$; oxidized fullerene; and derivatives thereof.

The photoconductive layer 4 has electromagnetic wave conductivity, and generates electric charges therein when radiation is irradiated thereon. Examples of materials for the photoconductive layer 4 include: a-Se; $HgI_2$; $PbI_2$; CdS; CdSe; CdTe; and $BiI_3$. It is particularly desirable for an a-Se film having selenium as its main component and a thickness within a range from 100 μm to 1000 μm to be employed as the photoconductive layer 4.

The second charge transport layer 5 is formed from a material having an average composition of $Sb_xS_{100-x}$ ($41 \leq x \leq 60$). It is more preferable for x to be within a range of $42 \leq x \leq 50$. It is desirable for the thickness of the second charge transport layer 5 to be greater than or equal to 0.5 μm, and preferably approximately 2 μm.

Figure 2:
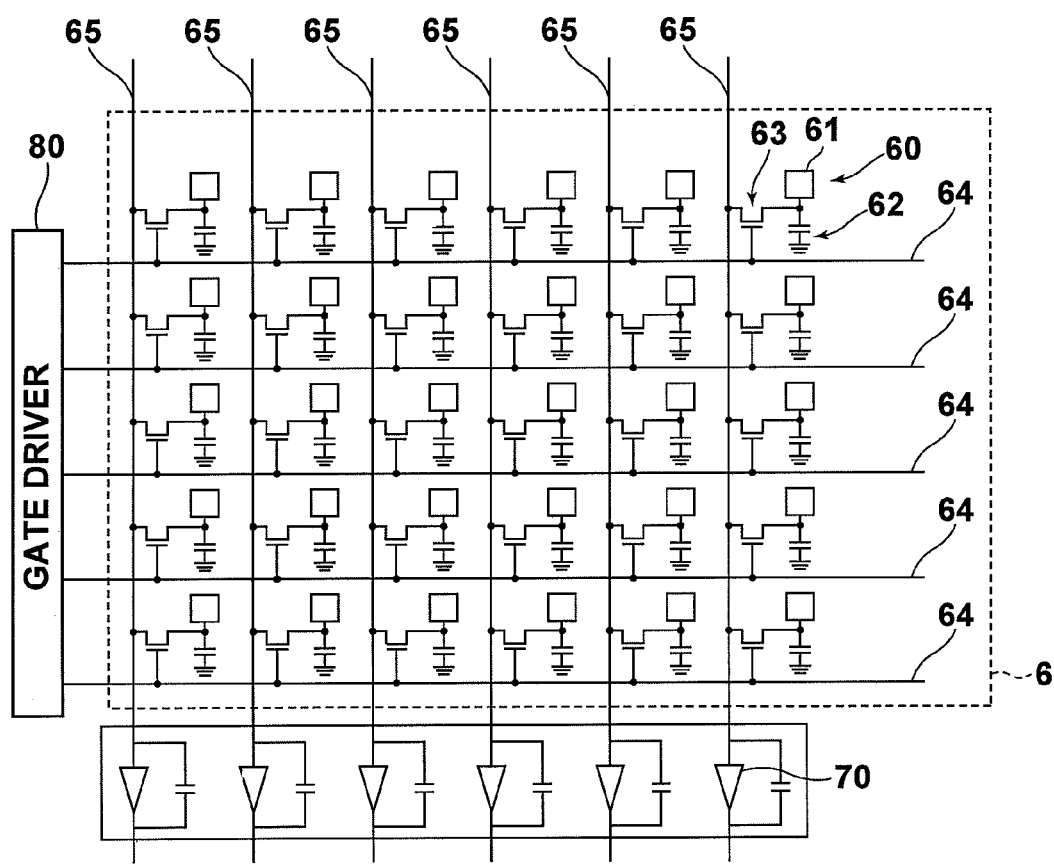
FIG. 2 is a plan view that illustrates an active matrix substrate of a radiation image detector illustrated in FIG. 1.

FIG. 2 is a plan view that illustrates the active matrix substrate 6. As illustrated in FIG. 2, a great number of pixels 60 are arranged two dimensionally on the active matrix substrate 6. Each pixel 60 is equipped with: a collecting electrode 61, for collecting the electric charges which are generated in the photoconductive layer 4; an accumulating capacitor 62, for accumulating the charges collected by the collecting electrode 61; and a TFT switch 63, for reading out the charges accumulated in the accumulating capacitor 28. A great number of scanning lines 65 for turning the TFT switches of each pixel 60 ON/OFF and a great number of data lines 66 for reading out the charges accumulated in the accumulating capacitors 62 are arranged in a lattice pattern. Readout circuits 70 including an amplifier for detecting signal charges that flow through the data lines 66 are connected to the ends of the data lines 66. A gate driver 80 that output control signals to turn the TFT switches 63 ON/OFF are connected to the scanning lines 65.

The material of the charge collecting electrodes 61 of the active matrix 6 is not particularly limited as long as it is a conductive material. However, it is preferable for the electrodes to transmit visible light. Examples of such materials are ITO and IZO.

The planar light source 20 is formed by mounting light emitting diodes having a central light emitting wavelength of approximately 525 nm onto a surface. The planar light source 20 may be provided separately from the radiation image detector 10, as illustrated in FIG. 1. Alternatively, the planar light source 20 may be adhesively attached to the active matrix substrate 6 by a transparent adhesive. The planar light source 20 uniformly emits light onto the side of the photoconductive layer 4 toward the active matrix substrate 6 during irradiation of radiation onto the radiation image detector 10. Note that the active matrix substrate 6 and the aforementioned adhesive are transparent with respect to the wavelength of light which is emitted by the planar light source 20.

EXAMPLES

Hereinafter, specific examples of the radiation image detector of the radiation image detecting device of the present invention will be described in detail.

Example 1

An antimony sulfide raw material having a composition of $Sb_{45}S_{55}$ was heated to 530° C., to form a second charge transport layer 5 of antimony sulfide (average composition: $Sb_{45}S_{55}$) at a film thickness of 2 µm on an active matrix substrate 6. Note that the antimony sulfide material having the composition of $Sb_{45}S_{55}$ was produced in the following manner. First, amounts of sulfur and antimony corresponding to a desired compositional ratio were measured. The measured sulfur and antimony were placed in a glass container, then the glass container was evacuated and sealed. The glass container was heated to a temperature greater than or equal to the melting point of antimony (630° C.) to cause the antimony to melt, and agitated by shaking for 15 hours or longer, to obtain an antimony sulfide solution having a uniform composition. The antimony sulfide having the desired compositional ratio was obtained by cooling the solution. The composition of the second charge transport layer 5 maybe measured by the following three methods. (1) A cross section of the radiation image detector may be cut out, and the composition of the portion that corresponds to the second charge transport layer 5 may be mapped by an energy dispersing X-ray spectrometer (EDX). (2) A portion of the radiation image detector that corresponds to the second charge transport layer 5 may be scraped out, and the average composition may be measured by X-ray fluorescence spectrometry (XRF). (3) The radiation image detector may be separated in the layering direction in the vicinity of the second charge transport layer 5, and the composition may be measured by the thin film XRF method.

After the second charge transport layer 5 was formed in the manner described above, an Se material, to which Na has been added at 10 ppm, was formed on the second charge transport layer 5 by vapor deposition, to form a photoconductive layer 4 of non crystalline Se at a film thickness of 1000 µm.

Next, an organic polymer layer 3 containing fullerene $C_{60}$ was formed as a film on the photoconductive layer 4. Nanom Purple ($C_{60}$) by the Frontier Carbon Corporation was utilized as the fullerene $C_{60}$. A coating solution having a solid concentration of 1.5 wt % was prepared by dissolving a polycarbonate resin ($PC_z$, PCZ-400 by Mitsubishi Gas Chemical K.K.) and the fullerene $C_{60}$ in o-dichlorobenzene at a ratio of 30 wt %:70 wt %. The solution was coated onto the photoconductive layer 4 by an ink jet coating apparatus. Thereafter, the solution was dried by a vacuum dryer to cause the solvent to evaporate, and the organic polymer layer 3 having a film thickness of 0.2 µm was obtained.

Next, an antimony sulfide material having a composition of $Sb_{42}S_{58}$ was heated to 545° C., to form a first charge transport layer 2 of antimony sulfide (average composition: $Sb_{42}S_{58}$) at a film thickness of 0.6 µm on the organic polymer layer 3 over a region greater than that organic polymer layer 3. Note that the method for producing the antimony sulfide material having a desired compositional ratio and the method for measuring the compositional ratio of the first charge transport layer 2 are the same as those for the second charge transport layer 5.

Finally, Au was formed as a film on the first charge transport layer 2 by vapor deposition, to form a biasing electrode 1 having a film thickness of 0.1 µm. The radiation image detector of Example 1 was produced in the manner described above.

The results of evaluation of the radiation image detector of Example 1 with respect to dark current, short term lag and long term lag are illustrated in Table 1. The evaluation methods for each item are as follows. Regarding the evaluation of dark current, a voltage of +10 kV was applied to the biasing electrode 1 in a state in which the charge collecting electrodes 61 of the active matrix substrate 6 were connected to an IV amplifier. Then, the current detected by the IV amplifier was measured by an oscilloscope.

Regarding the evaluation of short term lag, first, 710 ms pulse X rays are irradiated by an X ray source having a tube voltage of 80 kV and a tube current of 100 mA. Note that the X ray dosage at the position of the radiation image detector was 400 mR. A voltage of +10 kV was applied to the biasing electrode 1 in a state in which the charge collecting electrodes 61 of the active matrix substrate 6 were connected to an IV amplifier. Then, temporal changes in the current detected by the IV amplifier were measured by an oscilloscope. The current value, which was measured 15 seconds after cessation of the pulse X ray irradiation, was designated as the short term lag evaluation value. When the current value is converted to X ray dosage, less than or equal to 0.12 mR is preferable as the evaluation value, and less than or equal to 0.012 mR is more preferable.

Regarding the evaluation of long term lag, evaluations were performed by measuring the current that flowed through the charge collecting electrodes 61 following pulse X ray irradiation, similarly to the evaluation of short term lag. Note that for long term lag, the current value, which was measured 300 seconds after cessation of the pulse X ray irradiation, was designated as the long term lag evaluation value. When the current value is converted to X ray dosage, less than or equal to 0.012 mR is preferable as the evaluation value.

Note that the measurements of dark current, short term lag, and long term lag were performed in a state in which the planar light source 20 is emitting light at an intensity of 20 µW/mm² onto the radiation image detector 10.

material having a composition of $Sb_{44}S_{56}$ was heated to 590° C., to form a second charge transport layer 5 of antimony sulfide (average composition: $Sb_{44}S_{56}$) at a film thickness of 2 µm.

TABLE 1

| | Second Charge Transport Layer | Thickness of Second Charge Transport Layer | Organic Polymer Layer | First Charge Transport Layer | Dark Current | Short Term Lag | Long Term Lag |
|---|---|---|---|---|---|---|---|
| Example 1 | $Sb_{45}S_{55}$ | 2 µm | Yes | $Sb_{42}S_{58}$ | Good | Excellent | Excellent |
| Example 2 | $Sb_{44}S_{56}$ | 2 µm | Yes | $Sb_{42}S_{58}$ | Good | Excellent | Excellent |
| Example 3 | $Sb_{45}S_{55}$ | 2 µm | Yes | $Sb_{50}S_{50}$ | Good | Excellent | Excellent |
| Example 4 | $Sb_{42}S_{58}$ | 2 µm | No | $Sb_2S_3$ | Good | Good | Good |
| Example 5 | $Sb_{45}S_{55}$ | 0.4 µm | No | $Sb_2S_3$ | Usable (Fair) | Good | Good |
| Example 6 | $Sb_{45}S_{55}$ | 2 µm | No | $Sb_2S_3$ | Good | Good | Good |
| Example 7 | $Sb_{50}S_{50}$ | 2 µm | No | $Sb_2S_3$ | Good | Good | Good |
| Example 8 | $Sb_{45}S_{55}$ | 2 µm | Yes | $Sb_2S_3$ | Good | Excellent | Good |
| Comparative Example 1 | $Sb_2S_3$ | 2 µm | No | $Sb_2S_3$ | Unusable (Poor) | Usable (Fair) | Unusable (Poor) |

As illustrated in Table 1, the radiation image detector of Example 1 exhibited more favorable evaluation results for all of dark current, short term lag, and long term lag, compared to the radiation image detector of Comparative Example 1. Note that the radiation image detector of Comparative Example 1 was produced in the same manner as the radiation image detector of Example 1, except for the following points. (1) An antimony sulfide material having a composition of $Sb_2S_3$ was heated to 555° C., to form a second charge transport layer 5 of antimony sulfide (average composition: $Sb_2S_3$) at a film thickness of 2 µm. (2) An organic polymer layer was not provided. (3) An antimony sulfide material having a composition of $Sb_2S_3$ was heated to 555° C., to form a first charge transport layer 2 of antimony sulfide (average composition: $Sb_2S_3$) at a film thickness of 0.6 µm.

It is considered that favorable results were obtained for the evaluation of dark current, because the composition of the second charge transport layer 5 was $Sb_{45}S_{55}$. Thereby, the transmittance of light emitted from the planar light source 20 was decreased, and the entry of light into the photoconductive layer 4 was suppressed.

Short term lag occurs due to electric charges being trapped within faults in the interface between the photoconductive layer 4 and the biasing electrode 1. It is considered that the organic polymer layer 3 provided in the radiation image detector of Example 1 decreases the number of faults in the interface, thereby resulting in favorable evaluation regarding short term lag.

Long term lag occurs due to electric charges which are trapped as bulk charges in the photoconductive layer 4. It is considered that the composition of the first charge transport layer 2 being $Sb_{42}S_{58}$ in the radiation image detector of Example 1 enables the trapped bulk charges to be swept out toward the biasing electrode more efficiently. Accordingly, favorable evaluation results regarding long term lag properties were obtained.

Example 2

A radiation image detector of Example 2 was produced in the same manner as the radiation image detector of Example 1, except for the following point. (1) An antimony sulfide As illustrated in Table 1, the radiation image detector of Example 2 exhibited more favorable evaluation results for all of dark current, short term lag, and long term lag, compared to the radiation image detector of Comparative Example 1.

Example 3

A radiation image detector of Example 3 was produced in the same manner as the radiation image detector of Example 1, except for the following point. (1) An antimony sulfide material having a composition of $Sb_{50}S_{50}$ was heated to 530° C., to form a first charge transport layer 2 of antimony sulfide (average composition: $Sb_{50}S_{50}$) at a film thickness of 0.6 µm.

As illustrated in Table 1, the radiation image detector of Example 3 exhibited more favorable evaluation results for all of dark current, short term lag, and long term lag, compared to the radiation image detector of Comparative Example 1.

Example 4

A radiation image detector of Example 4 was produced in the same manner as the radiation image detector of Example 1, except for the following points. (1) An antimony sulfide material having a composition of $Sb_{42}S_{58}$ was heated to 555° C., to form a second charge transport layer 5 of antimony sulfide (average composition: $Sb_{42}S_{58}$) at a film thickness of 2 µm. (2) An organic polymer layer was not provided. (3) An antimony sulfide material having a composition of $Sb_2S_3$ was heated to 555° C., to form a first charge transport layer 2 of antimony sulfide (average composition: $Sb_2S_3$) at a film thickness of 0.6 µm.

As illustrated in Table 1, the radiation image detector of Example 4 exhibited more favorable evaluation results for all of dark current, short term lag, and long term lag, compared to the radiation image detector of Comparative Example 1. However, the first charge transport layer was formed by $Sb_2S_3$, and therefore the long term lag properties were poorer than those of the radiation image detector of Example 1. In addition, the organic polymer layer 3 was not provided, and therefore the short term lag properties were poorer than those of the radiation image detector of Example 1.

Example 5

A radiation image detector of Example 5 was produced in the same manner as the radiation image detector of Example 1, except for the following points. (1) The film thickness of the second charge transport layer 5 was made to be 0.4 μm. (2) An organic polymer layer was not provided. (3) An antimony sulfide material having a composition of $Sb_2S_3$ was heated to 555° C., to form a first charge transport layer 2 of antimony sulfide (average composition: $Sb_2S_3$) at a film thickness of 0.6 μm.

As illustrated in Table 1, the radiation image detector of Example 5 exhibited more favorable evaluation results for short term lag and long term lag, compared to the radiation image detector of Comparative Example 1. However, because the thickness of the second charge transport layer 5 was made thinner, the dark current properties were poorer than those of the radiation image detector of Example 1. From these results, it was understood that it is desirable for the thickness of the second charge transport layer 5 to be 0.5 μm or greater. In addition, because the first charge transport layer 2 was formed by $Sb_2S_3$, the long term lag properties were poorer than those of the radiation image detector of Example 1. Further, the organic polymer layer 3 was not provided, and therefore the short term lag properties were poorer than those of the radiation image detector of Example 1.

Example 6

A radiation image detector of Example 6 was produced in the same manner as the radiation image detector of Example 1, except for the following points. (1) An organic polymer layer was not provided. (2) An antimony sulfide material having a composition of $Sb_2S_3$ was heated to 555° C., to form a first charge transport layer 2 of antimony sulfide (average composition: $Sb_2S_3$) at a film thickness of 0.6 μm.

As illustrated in Table 1, the radiation image detector of Example 6 exhibited more favorable evaluation results for all of dark current, short term lag, and long term lag, compared to the radiation image detector of Comparative Example 1. However, because the first charge transport layer was formed by $Sb_2S_3$, the long term lag properties were poorer than those of the radiation image detector of Example 1. In addition, the organic polymer layer 3 was not provided, and therefore the short term lag properties were poorer than those of the radiation image detector of Example 1.

Example 7

A radiation image detector of Example 7 was produced in the same manner as the radiation image detector of Example 1, except for the following points. (1) An antimony sulfide material having a composition of $Sb_{50}S_{50}$ was heated to 530° C., to form a second charge transport layer 5 of antimony sulfide (average composition: $Sb_{50}S_{50}$) at a film thickness of 2 μm. (2) An antimony sulfide material having a composition of $Sb_2S_3$ was heated to 555° C., to form a first charge transport layer 2 of antimony sulfide (average composition: $Sb_2S_3$) at a film thickness of 0.6 μm.

As illustrated in Table 1, the radiation image detector of Example 7 exhibited more favorable evaluation results for all of dark current, short term lag, and long term lag, compared to the radiation image detector of Comparative Example 1.

Example 8

A radiation image detector of Example 8 was produced in the same manner as the radiation image detector of Example 1, except for the following point. (1) An antimony sulfide material having a composition of $Sb_2S_3$ was heated to 555° C., to form a first charge transport layer 2 of antimony sulfide (average composition: $Sb_2S_3$) at a film thickness of 2 μm.

As illustrated in Table 1, the radiation image detector of Example 8 exhibited more favorable evaluation results for all of dark current, short term lag, and long term lag, compared to the radiation image detector of Comparative Example 1. However, because the first charge transport layer was formed by $Sb_2S_3$, the long term lag properties were poorer than those of the radiation image detector of Example 1.

Based on the evaluation results of Examples 1 through 8 and Comparative Example 1, it can be understood that the dark current properties are improved when the average composition of the second charge transport layer 5 is $Sb_xS_{100-x}$ ($42 \leq x \leq 50$), compared to cases in which the average composition of the second charge transport layer 5 is $Sb_2S_3$. Note that as the ratio of Sb increases, the transmissivity with respect to light decreases. Therefore, it is considered that improvements in the dark current properties can be obtained if the average composition of the second charge transport layer 5 is $Sb_xS_{100-x}$ ($42 \leq x \leq 60$).

In addition, it can be understood that short term lag properties can be improved by providing the organic polymer layer 3.

Further, it can be understood that the long term lag properties can be improved when the average composition of the first charge transport layer 2 is $Sb_yS_{100-y}$ ($42 \leq x \leq 50$), compared to cases in which the average composition of the second charge transport layer 5 is $Sb_2S_3$. Note that as the ratio of Sb increases, charge transport properties are improved. Therefore, it is considered that improvements in the long term lag properties can be obtained if the average composition of the first charge transport layer 2 is $Sb_yS_{100-y}$ ($42 \leq y \leq 60$).

The radiation image detectors of the embodiments which have been described above are so called direct conversion type radiation image detectors that record radiation images by receiving irradiation of radiation and directly converting the radiation into electric charges. However, the present invention is not limited to this type of radiation image detector. The present invention may also be applied to radiation image detectors of the so called indirect conversion type, in which radiation images are recorded by temporarily converting radiation to light, then converting the light to electric charges. Note that in radiation image detectors of the indirect conversion type, the a-Se layer is thinner than that of radiation image detectors of the direct conversion type. A light transmissive biasing electrode is provided, phosphors are provided above the biasing electrode, and the light emitted by the phosphors is converted to electric charges. Note that in radiation image detectors constructed in this manner, the thickness of the photoconductive layer is within a range of approximately 1 μm to 30 μm, and accumulating capacitors are not necessary.

Active matrix substrates, in which a great number of TFT switches are arranged, were employed in the radiation image detectors of the embodiments described above. However, the present invention may also be applied to radiation image detectors having active matrix substrates in which a great number of other switching elements, such as MOS switches, are arranged.

What is claimed is:
1. A radiation image detecting apparatus, comprising:
   a radiation image detector, in which a biasing electrode to which a biasing voltage is applied, a photoconductive layer for generating electric charges when irradiated with recording electromagnetic waves bearing a radiation image, a substrate side charge transport layer for transporting the electric charges which are generated in the photoconductive layer, and an active matrix sub- strate provided with a plurality of charge collecting electrodes for collecting the electric charges which are generated in the photoconductive layer, are laminated in this order; and light emitting means, for emitting light onto the radiation image detector at least during irradiation of the recording electromagnetic waves;

the average composition of the substrate side charge transport layer being $Sb_xS_{100-x}$ ($41 \leq x \leq 60$).

2. A radiation image detecting apparatus as defined in claim 1, wherein:

the film thickness of the substrate side charge transport layer is greater than or equal to 0.5 μm.

3. A radiation image detecting apparatus as defined in claim 1, further comprising:

a biasing electrode side charge transport layer, provided between the biasing electrode and the photoconductive layer; and wherein:

the average composition of the biasing electrode side charge transport layer is $Sb_yS_{100-y}$ ($41 \leq y \leq 60$).

4. A radiation image detecting apparatus as defined in claim 3, further comprising:

an organic polymer layer that contains a positive hole blocking material, provided between the biasing electrode side charge transport layer and the photoconductive layer.

5. A radiation image detecting apparatus as defined in claim 1, further comprising:

an organic polymer layer that contains a positive hole blocking material, provided between the biasing electrode side charge transport layer and the photoconductive layer.

6. A radiation image detecting apparatus as defined in claim 4, wherein:

the positive hole blocking material is at least one carbon cluster selected from among a group consisting of: fullerene $C_{60}$; fullerene $C_{70}$; oxidized fullerene; and derivatives thereof.

7. A radiation image detecting apparatus as defined in claim 5, wherein:

the positive hole blocking material is at least one carbon cluster selected from among a group consisting of: fullerene $C_{60}$; fullerene $C_{70}$; oxidized fullerene; and derivatives thereof.

* * * * *